(12) United States Patent
Ulm et al.

(10) Patent No.: US 8,516,532 B2
(45) Date of Patent: Aug. 20, 2013

(54) IP VIDEO DELIVERY USING FLEXIBLE CHANNEL BONDING

(75) Inventors: John M. Ulm, Pepperell, MA (US); Patrick M. Maurer, Wayland, MA (US); Michael W. Patrick, Assonet, MA (US)

(73) Assignee: Motorola Mobility LLC, Libertyville, IL (US)

(*) Notice: Subject to any disclaimer, the term of this patent is extended or adjusted under 35 U.S.C. 154(b) by 173 days.

(21) Appl. No.: 12/843,858

(22) Filed: Jul. 26, 2010

(65) Prior Publication Data

US 2011/0030019 A1    Feb. 3, 2011

Related U.S. Application Data

(60) Provisional application No. 61/229,269, filed on Jul. 28, 2009.

(51) Int. Cl.
*H04N 7/173* (2011.01)

(52) U.S. Cl.
USPC ............... 725/95; 725/90; 725/93; 725/96

(58) Field of Classification Search
USPC ............ 725/90, 91, 93, 95, 96, 97, 98, 105, 725/109, 114, 116, 118
See application file for complete search history.

(56) References Cited

U.S. PATENT DOCUMENTS

| | | | |
|---|---|---|---|
| 3,838,221 A | 9/1974 | Schmidt et al. | |
| 4,245,342 A | 1/1981 | Entenman | |
| 4,385,392 A | 5/1983 | Angell et al. | |
| 4,811,360 A | 3/1989 | Potter | |
| 4,999,787 A | 3/1991 | McNally et al. | |
| 5,228,060 A | 7/1993 | Uchiyama | |
| 5,251,324 A | 10/1993 | McMullan | |
| 5,271,060 A | 12/1993 | Moran et al. | |
| 5,278,977 A | 1/1994 | Spencer et al. | |

(Continued)

FOREIGN PATENT DOCUMENTS

| | | |
|---|---|---|
| EP | 1235402 A2 | 8/2002 |
| EP | 1341335 A2 | 9/2003 |

(Continued)

OTHER PUBLICATIONS

Sangeeta Ramakrishnam, "Scaling the DOCSIS Network for IPTV", Cisco Systems, Inc., SCTE Conference on Emerging Technologies and the NCTA Cable Show, 2009. (19 pages).

(Continued)

*Primary Examiner* — John Schnurr

(57) ABSTRACT

An IP video delivery system and method that allocates a first number of video streams for delivery on a number of channels that, provides a number of bonding groups, where each bonding group bonds at least one of the channels, and allocates a second number of video streams for delivery on the bonding groups. In one aspect, the method delivers the first video streams as unbonded on the channels. The bonding groups utilize bandwidth unused by the first video streams. In one aspect, the method utilizes bandwidth unused by the first or second video streams for high speed data. The method provides instantaneous load balancing to spread the first and second video streams across all available bandwidth in the channels, and delivers those video streams using a variable bit rate with no additional statistical multiplexing rate shaping to fit video streams into the channels.

22 Claims, 9 Drawing Sheets

(56) References Cited

U.S. PATENT DOCUMENTS

| | | |
|---|---|---|
| 5,347,539 A | 9/1994 | Sridhar et al. |
| 5,390,339 A | 2/1995 | Bruckert et al. |
| 5,463,661 A | 10/1995 | Moran et al. |
| 5,532,865 A | 7/1996 | Utsumi et al. |
| 5,557,603 A | 9/1996 | Barlett et al. |
| 5,606,725 A | 2/1997 | Hart |
| 5,631,846 A | 5/1997 | Szurkowski |
| 5,694,437 A | 12/1997 | Yang et al. |
| 5,732,104 A | 3/1998 | Brown et al. |
| 5,790,523 A | 8/1998 | Ritchie et al. |
| 5,867,539 A | 2/1999 | Koslov |
| 5,870,429 A | 2/1999 | Moran et al. |
| 5,886,749 A | 3/1999 | Williams et al. |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,154,503 A | 11/2000 | Strolle |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran et al. |
| 6,385,773 B1 | 5/2002 | Schwartzman et al. |
| 6,389,068 B1 | 5/2002 | Smith et al. |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al Araji et al. |
| 6,556,562 B1 | 4/2003 | Bhagavath et al. |
| 6,556,660 B1 | 4/2003 | Li et al. |
| 6,559,756 B2 | 5/2003 | Al Araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,816,463 B2 | 11/2004 | Cooper et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,999,408 B1 | 2/2006 | Gomez |
| 7,002,899 B2 | 2/2006 | Azenkot et al. |
| 7,010,002 B2 | 3/2006 | Chow et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,616,654 B2 | 11/2009 | Moran et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,778,314 B2 | 8/2010 | Wajcer et al. |
| 7,787,557 B2 | 8/2010 | Kim et al. |
| 7,792,183 B2 | 9/2010 | Massey et al. |
| 7,856,049 B2 | 12/2010 | Currivan et al. |
| 7,876,697 B2 | 1/2011 | Thompson et al. |
| 7,953,144 B2 | 5/2011 | Allen et al. |
| 7,970,010 B2 | 6/2011 | Denney et al. |
| 8,000,254 B2 | 8/2011 | Thompson et al. |
| 8,037,541 B2 | 10/2011 | Montague et al. |
| 8,040,915 B2 | 10/2011 | Cummings |
| 8,059,546 B2 | 11/2011 | Pai et al. |
| 8,081,674 B2 | 12/2011 | Thompson et al. |
| 8,116,360 B2 | 2/2012 | Thibeault |
| 8,265,559 B2 | 9/2012 | Cooper et al. |
| 8,284,828 B2 | 10/2012 | Cooper et al. |
| 8,345,557 B2 | 1/2013 | Thibeault et al. |
| 2001/0055319 A1 | 12/2001 | Quigley et al. |
| 2002/0038461 A1 | 3/2002 | White et al. |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0101463 A1 | 5/2003 | Greene et al. |
| 2003/0108052 A1 | 6/2003 | Inoue et al. |

| | | | |
|---|---|---|---|
| 2003/0120819 A1 | 6/2003 | Abramson et al. | |
| 2003/0138250 A1 | 7/2003 | Glynn | |
| 2003/0149991 A1 | 8/2003 | Reidhead et al. | |
| 2003/0158940 A1 | 8/2003 | Leigh | |
| 2003/0179768 A1 | 9/2003 | Lusky et al. | |
| 2003/0179770 A1 | 9/2003 | Reznic et al. | |
| 2003/0179821 A1 | 9/2003 | Lusky et al. | |
| 2003/0181185 A1 | 9/2003 | Lusky et al. | |
| 2003/0182664 A1 | 9/2003 | Lusky et al. | |
| 2003/0185176 A1 | 10/2003 | Lusky et al. | |
| 2003/0188254 A1 | 10/2003 | Lusky et al. | |
| 2003/0200317 A1 | 10/2003 | Zeitak et al. | |
| 2003/0212999 A1 | 11/2003 | Cai | |
| 2004/0015765 A1 | 1/2004 | Cooper et al. | |
| 2004/0042385 A1 | 3/2004 | Kim et al. | |
| 2004/0047284 A1 | 3/2004 | Eidson | |
| 2004/0062548 A1 | 4/2004 | Obeda et al. | |
| 2004/0073937 A1 | 4/2004 | Williams | |
| 2004/0096216 A1 | 5/2004 | Ito | |
| 2004/0109661 A1 | 6/2004 | Bierman et al. | |
| 2004/0139473 A1 | 7/2004 | Greene | |
| 2004/0163129 A1* | 8/2004 | Chapman et al. | 725/126 |
| 2004/0181811 A1 | 9/2004 | Rakib | |
| 2004/0208513 A1 | 10/2004 | Peddanarappagari et al. | |
| 2004/0233234 A1 | 11/2004 | Chaudhry et al. | |
| 2004/0233926 A1 | 11/2004 | Cummings | |
| 2004/0248520 A1 | 12/2004 | Miyoshi | |
| 2004/0261119 A1 | 12/2004 | Williams et al. | |
| 2005/0010958 A1 | 1/2005 | Rakib et al. | |
| 2005/0025145 A1 | 2/2005 | Rakib et al. | |
| 2005/0034159 A1 | 2/2005 | Ophir et al. | |
| 2005/0039103 A1 | 2/2005 | Azenko et al. | |
| 2005/0058082 A1 | 3/2005 | Moran et al. | |
| 2005/0064890 A1 | 3/2005 | Johan et al. | |
| 2005/0097617 A1 | 5/2005 | Currivan et al. | |
| 2005/0108763 A1 | 5/2005 | Baran et al. | |
| 2005/0122996 A1 | 6/2005 | Azenkot et al. | |
| 2005/0163088 A1 | 7/2005 | Yamano et al. | |
| 2005/0175080 A1 | 8/2005 | Bouillett | |
| 2005/0183130 A1 | 8/2005 | Sadja et al. | |
| 2005/0198688 A1 | 9/2005 | Fong | |
| 2005/0226161 A1 | 10/2005 | Jaworski | |
| 2005/0281200 A1 | 12/2005 | Terreault | |
| 2006/0013147 A1 | 1/2006 | Terpstra et al. | |
| 2006/0121946 A1 | 6/2006 | Walton et al. | |
| 2006/0250967 A1 | 11/2006 | Miller et al. | |
| 2006/0262722 A1 | 11/2006 | Chapman et al. | |
| 2007/0002752 A1 | 1/2007 | Thibeault et al. | |
| 2007/0058542 A1 | 3/2007 | Thibeault | |
| 2007/0076592 A1 | 4/2007 | Thibeault et al. | |
| 2007/0076789 A1 | 4/2007 | Thibeault | |
| 2007/0076790 A1 | 4/2007 | Thibeault et al. | |
| 2007/0086328 A1 | 4/2007 | Kao et al. | |
| 2007/0094691 A1 | 4/2007 | Gazdzinski | |
| 2007/0097907 A1 | 5/2007 | Cummings | |
| 2007/0133672 A1 | 6/2007 | Lee et al. | |
| 2007/0143654 A1 | 6/2007 | Joyce et al. | |
| 2007/0147489 A1 | 6/2007 | Sun et al. | |
| 2007/0177526 A1 | 8/2007 | Siripunkaw et al. | |
| 2007/0184835 A1 | 8/2007 | Bitran et al. | |
| 2007/0189770 A1 | 8/2007 | Sucharczuk et al. | |
| 2007/0206600 A1 | 9/2007 | Klimker et al. | |
| 2007/0206625 A1 | 9/2007 | Maeda | |
| 2007/0211618 A1 | 9/2007 | Cooper et al. | |
| 2007/0223920 A1 | 9/2007 | Moore et al. | |
| 2007/0245177 A1 | 10/2007 | Cooper et al. | |
| 2008/0056713 A1 | 3/2008 | Cooper et al. | |
| 2008/0062888 A1 | 3/2008 | Lusky et al. | |
| 2008/0075157 A1 | 3/2008 | Allen et al. | |
| 2008/0101210 A1 | 5/2008 | Thompson et al. | |
| 2008/0140823 A1 | 6/2008 | Thompson et al. | |
| 2008/0193137 A1 | 8/2008 | Thompson et al. | |
| 2008/0200129 A1 | 8/2008 | Cooper et al. | |
| 2008/0242339 A1 | 10/2008 | Anderson | |
| 2008/0250508 A1 | 10/2008 | Montague et al. | |
| 2008/0274700 A1 | 11/2008 | Li | |
| 2008/0291840 A1 | 11/2008 | Cooper et al. | |
| 2009/0031384 A1 | 1/2009 | Brooks et al. | |
| 2009/0103557 A1 | 4/2009 | Hong et al. | |
| 2009/0103669 A1 | 4/2009 | Kolze et al. | |
| 2009/0249421 A1* | 10/2009 | Liu et al. | 725/116 |
| 2010/0083356 A1 | 4/2010 | Steckley et al. | |
| 2010/0095360 A1 | 4/2010 | Pavlovski et al. | |
| 2010/0154017 A1 | 6/2010 | An et al. | |
| 2010/0157824 A1 | 6/2010 | Thompson et al. | |
| 2010/0158093 A1 | 6/2010 | Thompson et al. | |
| 2010/0223650 A1 | 9/2010 | Millet et al. | |
| 2011/0026577 A1 | 2/2011 | Primo et al. | |
| 2011/0069745 A1 | 3/2011 | Thompson et al. | |
| 2011/0110415 A1 | 5/2011 | Cooper et al. | |
| 2011/0194418 A1 | 8/2011 | Wolcott et al. | |
| 2011/0194597 A1 | 8/2011 | Wolcott et al. | |
| 2011/0197071 A1 | 8/2011 | Wolcott et al. | |
| 2011/0243214 A1 | 10/2011 | Wolcott et al. | |
| 2012/0054312 A1 | 3/2012 | Salinger | |
| 2012/0084416 A1 | 4/2012 | Thibeault et al. | |
| 2012/0147751 A1 | 6/2012 | Ulm | |

FOREIGN PATENT DOCUMENTS

| | | |
|---|---|---|
| JP | 55132161 A | 10/1980 |
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004172783 A | 6/2004 |
| JP | 2004343678 A | 12/2004 |
| WO | 0192901 A1 | 6/2001 |
| WO | 0233974 A1 | 4/2002 |
| WO | 2004062124 A1 | 7/2004 |
| WO | 2009146426 A1 | 12/2009 |

OTHER PUBLICATIONS

Xiaomei Liu and Alon Bernstein, "Variable Bit Rate Video Services in DOCSIS 3.0 Networks", NCTA Technical Papers, 2008. (12 pages).

PCT Search Report & Written Opinion, RE: Application #PCT/US2011/062048; Mar. 7, 2012.

Patrick & Joyce, "Delivering Economical IP Video Over DOCSIS by Bypassing the M-CMTS with DIBA", SCTE 2007 Emerging Technologies, Topic Subject: Service Velocity & Next Generation Architectures: How Do We Get There?, 2007.

PCT Search Report & Written Opinion, RE: Application #PCT/US10/43364; Sep. 16, 2010.

X. Liu et al., "Variable Bit Rate Video Services in DOCSIS 3.0 Networks", National Cable & Telecommunications Association (NCTA) Technical Papers, Cisco Systems, Inc., May 2008.

R. Thompson, et al., "Optimizing Upstream Throughput Using Equalization Coefficient Analysis", National Cable & Telecommunications Association (NCTA) Technical Papers, Apr. 2009.

R. L. Howald et al., "Characterizing and Aligning the HFC Return Path for Successful DOCSIS 3.0 Rollouts", Society of Cable Telecommunications Engineers (SCTE) Cable Tec Expo, Oct. 2009.

"A Simple Algorithm for Fault Localization Using Naming Convention and Micro-reflection Signature," Invention Disclosure 60193, Cable Television Laboratories, Inc., Jun. 2008, p. 2.

"Data-Over-Cable Service Interface Specifications DOCSIS 3.0: MAC and Upper Layer Protocols Interface," CM-SP-MULPIv3.0-I16-110623, Cable Television Laboratories, Inc., Jun. 2011, section 8, pp. 242-266.

"Data-Over-Cable Service Interface Specifications DOCSIS® 3.0—MAC and Upper Layer Protocols Interface Specification," CM-SP-MULPIv3.0-I17-111117, Cable Television Laboratories, Inc., Nov. 17, 2011, pp. 770.

"Pre-Equalization Based Pro-active Network Maintenance Process Model for CMs Transmitting on Multiple Upstream Channels," Invention Disclosure 60203, Cable Television Laboratories, Inc., May 2009, pp. 2.

"Pre-Equalization based pro-active network maintenance process model", Invention Disclosure 60177, Cable Television Laboratories, Inc., Jun. 2008, pp. 2.

"Proactive Network Maintenance Using Pre-Equalization," DOCSIS Best Practices and Guidelines, Cable Television Laboratories, Inc., CM-GL-PNMP-V02-110623, Jun. 23, 2011, pp. 133.

Campos, L. A., et al., "Pre-equalization based Pro-active Network Maintenance Methodology," Cable Television Laboratories, Inc., (presentation), 2012, pp. 32.

Howald, R., "Access Networks Solutions: Introduction to S-CDMA," presentation to Society of Cable Telecommunications Engineers (SCTE) South Florida Chapter, Motorola, Inc., 2009, pp. 15.

Howald, R., "Upstream Snapshots & Indicators (2009)," Regional Samples, Presentation to Society of Cable Telecommunications Engineers (SCTE) South Florida Chapter, Jan. 2010, pp. 22.

Howald, R.,"DOCSIS 3.0 Upstream: Technology, RF Variables & Case Studies," Access Networks Solutions, 2009, presentation to Society of Cable Telecommunications Engineers (SCTE) South Florida Chapter, Jan. 2010, pp. 23.

Hranac, R., "Linear Distortions, Part 1," Communication Technology, Jul. 1, 2005, accessed at www.cable360.net/print/ct/operations/testing/15131.html, pp. 6.

Motorola., "White Paper: Expanding Bandwidth Using Advanced Spectrum Management," Sep. 25, 2003, pp. 12.

Newton's Telecom Dictionary, Sep. 1995, Flatiron Publishing, 9th Edition, pp. 216 and 1023, definitions of "carrier to noise ratio" and "signal to noise ratio".

Popper, A., et al, "An Advanced Receiver with Interference Cancellation for Broadband Cable Networks," Juniper Networks, International Zurich Seminar on Broadband Communications Access 2002, pp. 23-1-23-6.

Popper, A., et al, "Ingress Noise Cancellation for the Upstream Channel in Broadband Cable Access Systems," Juniper Networks, IEEE International Conference on Communications 2002, vol. 3, pp. 1808-1812.

Qureshi, S. U. H., "Adaptive Equalization," IEEE, vol. 73, No. 9, Sep. 1985, pp. 1349-1387.

Shelke, Y. R., "Knowledge Based Topology Discovery and Geo-localization," Thesis, 2010, pp. 173.

Thompson, R., et al., "256-QAM for Upstream HFC," Spring Technical Forum Proceedings, 2010, pp. 142-152.

Thompson, R., et al., "256-QAM for Upstream HFD Part Two," SCTE Cable Tec Expo 2011, Technical Paper, pp. 22.

Thompson, R., et al., "Multiple Access Made Easy," SCTE Cable Tec Expo 2011, Technical Paper, pp. 23.

Thompson, R., et al., "Practical Considerations for Migrating the Network Toward All-Digital," Society of Cable Telecommunications Engineers (SCTE) Cable-Tec Expo, Oct. 2009, pp. 22.

Thompson, R., et al., "64-QAM, 6.4MHz Upstream Deployment Challenges," SCTE Canadian Summit, Toronto, Canada, Technical Paper, Mar. 2011, pp. 25.

Volpe, B., and Miller, W., "Cable-Tec Expo 2011: Advanced Troubleshooting in a DOCSIS © 3.0 Plant," Nov. 14-17, 2011, pp. 17.

Wolcott, L., "Modem Signal Usage and Fault Isolation," U.S. Appl. No. 61/301,835, filed Feb. 5, 2010.

Zhao, F., et al., "Techniques for minimizing error propagation in decision feedback detectors for recording channels," IEEE Transactions on Magnetics, vol. 37, No. 1, Jan. 2001, pp. 12.

Korean Intellectual Property Office (KIPO) "Notice of Preliminary Rejection" for Korean Patent Application No. 10-2012-7002387 dated Apr. 29, 2013, 3 pages.

* cited by examiner

IP VIDEO DELIVERY USING FLEXIBLE CHANNEL BONDING

RELATED APPLICATION

This application for letters patent relates to and claims the benefit of U.S. Provisional Patent Application Ser. No. 61/229,269, titled "IP Video Delivery Using Flexible Channel Bonding", and filed on Jul. 28, 2009; the disclosure of which this application hereby incorporates by reference.

BACKGROUND

Data Over Cable Service Interface Specification (DOCSIS) 3.0 technology with its multiple bonded channels is enabling new services such as Internet Protocol (IP) Video delivery over the larger DOCSIS 3.0 pipe. These video streams are typically delivered as multicast packets to a cable modem termination system (CMTS) and "switched" by the CMTS so that only those video streams being watched are actually sent down a DOCSIS channel. Today, Constant Bit Rate (CBR) video streams are typically used because of the simplified traffic management associated with them. Variable Bit Rate (VBR) video streams provide a significantly lower overall average bit rate than CBR (e.g., 30-40%), but it may have peak rates that are two to three times its average rate. If multiple VBR streams in a given channel peak simultaneously, the bandwidth required may exceed the capacity of the channel. Since the video streams might not be encoded jointly, this phenomenon is non-deterministic and may result in dropped packets. With the extensive encoding used in video streams today, each dropped packet can introduce significant impairments to the video quality. If the channel congestion causes the Customer Premises Equipment (CPE) video buffers to underflow, some decoders have been known to lock and require a reset. With today's high-definition services, quality is an extremely important feature so dropped packets are a significant issue.

Today, VBR is often used for broadcast video services where a Statistical Multiplexer can rate shape the peaks as needed to keep the bandwidth within the channel capacity and prevent dropped packets. However, the complexity of Statistical Multiplexers makes them economically unfeasible to use for extensive narrowcast services with smaller service groups expected in IP Video systems.

Some IP Video delivery systems have packet recovery algorithms. These could potentially be used to recover packets that are dropped when the channel capacity is exceeded. The drawbacks of this approach are the added costs of the repair servers and added buffer delays needed to account for the detection, request and re-transmission of dropped packets. Another common packet recovery method is to provide packet level forward error correction (FEC) that the CPE client can use to recover dropped packets. The drawbacks of this approach are the 5% to 20% additional channel capacity required to send the FEC and the extra processing power required by the CPE.

A problem is caused by current bonding limitations with DOCSIS 3.0 devices. For example, to scale IP Video to service groups of several hundred subscribers could require a total 16 to 24 channels for IP Video, which exceeds the abilities of today's commercially available cable modems and cannot be bonded into a single bonding group. Today's commercially available cable modems support only the minimum DOCSIS 3.0 required 4 bonded channels; and even next generation modems about to come to market provide a maximum of 8 bonded channels, some of which are needed for high speed data service, instead of IP Video. Dividing 16 to 24 IP video channels into smaller 4-8 channel bonding groups reduces the overall statistical advantages gained and increases the total number of channels needed. At the same time, choosing a fixed sized bonding group (e.g., 4 bonded channels) for the IP Video service excludes any other devices that may, for example, only have 1, 2 or 3 channels available for the IP Video service.

The prior art in Ramakrishnan, "Scaling the DOCSIS Network for IPTV," SCTE ET 2009 (hereinafter referred to as "Ramakrishnan"), discloses a packing efficiency improvement provided by 4-channel bonding. FIG. 1A and FIG. 1B depict an illustrative comparison of 4 separate quadrature amplitude modulation (QAM) channels to a 4-channel bonding group, in accordance with the prior art. In one embodiment, the QAM channels are 6-MHz North American signals. FIG. 1A shows 4 separate (and unbonded) QAM channels (QAM1-QAM4) having a channel capacity that allow 10 unbonded standard-definition (SD) streams (SD1-SD10) and 5 unbonded high-definition (HD) streams (HD1-HD5), but leaving QAM channel capacity that is not used because it is not sufficient to allow any additional unbonded HD streams. FIG. 1B shows 4 bonded QAM channels (QAM1-QAM4) having a channel capacity that allow 10 bonded SD streams (SD1-SD10) and 7 bonded HD streams (HD1-HD7). Thus, 4 bonded QAM channels can provide more video capacity than 4 separate (and unbonded) QAM channels.

The prior art in Bernstein & Liu, "VBR Video Services in DOCSIS 3.0 Networks," NCTA 2008 (hereinafter referred to as "Bernstein") reach a similar conclusion to Ramakrishnan. Bernstein discloses that VBR in a 4-channel bonding group provided a 57.5% increase (i.e., 63 streams for 4 channels); while VBR in a single unbonded channel provided a 40% increase (i.e., 14 streams for a single channel, or 56 streams across 4 single channels). For example, in Bernstein, FIG. 4 illustrates VBR network statistical multiplexing bandwidth utilization improvement. Hence, Bernstein discloses that bonding 4 channels together can provide an increase in video capacity from 56 to 63 streams. The problem now is that all devices wishing to see these video services must support 4 bonded channels. All other devices cannot access this content.

There is a demand for an IP video delivery method and system to allocate flexibly sized bonding group over unbonded channels. The presently disclosed invention satisfies this demand.

SUMMARY

Aspects of the present invention provide an IP video delivery system and method that allocates a first number of video streams for delivery on a number of channels that, provides a number of bonding groups, where each bonding group bonds at least one of the channels, and allocates a second number of video streams for delivery on the bonding groups. In one aspect, the method delivers the first video streams as unbonded on the channels. The bonding groups utilize bandwidth unused by the first video streams. In one aspect, the method utilizes bandwidth unused by the first or second video streams for high speed data. The method provides instantaneous load balancing to spread the first and second video streams across all available bandwidth in the channels, and delivers those video streams using a variable bit rate with no additional statistical multiplexing rate shaping to fit video streams into the channels.

DETAILED DESCRIPTION

Aspects of the present invention address how to leverage VBR for IP Video services to support significantly more video streams than CBR, without incurring the dropped packets or the drawbacks of other state of the art implementations.

Figure 2:
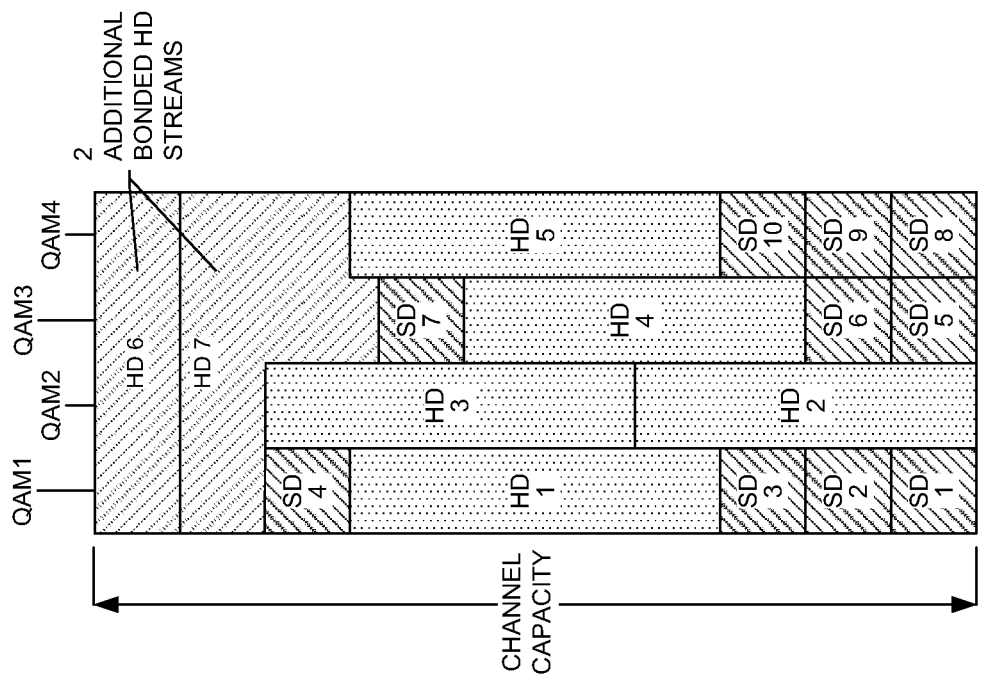
FIG. 2 is a network diagram that illustrates one embodiment of the hardware components of a system that performs the present invention.

FIG. 2 is a network diagram that illustrates one embodiment of the hardware components of a system that performs the present invention. A broadband network 200 includes an Internet Protocol (IP) network 210 and a cable network 230. In one embodiment, the cable network 230 is a hybrid fiber-coaxial (HFC) network. The cable network 230 is a data and video content network that connects a customer location 240 to a cable modem termination system (CMTS) 220. The broadband network 200 shown in FIG. 2 may include any number of interconnected IP network 210, CMTS 220, cable network 230, and customer location 240.

The IP network 210 shown in FIG. 2, in one embodiment, is a public communication network or wide area network (WAN) that connects to the CMTS 220. The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a Wireless-Fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

The CMTS 220 provides the subscriber location 240 with various services and/or connections, such as support for data over cable service interface specification (DOCSIS), an instantaneous load balancing process 222, and the connection to the IP network 210. For example, the CMTS 220 may provide a connection to external services such as video servers, public switched telephone network voice, multimedia messages, and internet data.

In an embodiment of the present invention, an innovative use of DOCSIS 3.0 bonding groups together with the instantaneous load balancing process 222 in the CMTS 220 can enable the operator to use VBR with the highest quality (i.e., no additional rate shaping needed to fit video streams into QAM channels), and best utilization possible, while providing the greatest flexibility. Conventionally, DOCSIS bonding groups are typically thought of as fixed sized, non-overlapping groups, sometimes as hierarchical. However, in an embodiment, flexible channel bonding is a key to leveraging the full power of VBR.

An embodiment of a flexible channel bonding of the present invention with the instantaneous load balancing process 222 enables an exemplary system to fully utilize VBR video streams for IP Video delivery over cable. The complete original VBR stream is delivered to the customer location 240 for maximum video quality, compared to some schemes that rate shape the video stream for traffic management but impacts video quality. The flexibility is derived from popular content being sent down single channels that can be received by any DOCSIS device, regardless of the resources available for bonding. Furthermore, multiple-receive channel cable modems can receive the non-bonding popular IPTV without having to join a "bonding group" of a fixed 4 channels. Providing larger bonding groups for "Long Tail" content (i.e., less popular content) enables the IP Video channels to maximize utilization.

In general, "popular" content as used herein refers to content items accounting for a disproportionate share of demand. In one illustrative example of popularity of content, "popular" content may refer to the first 20% of content items in a rank-ordered distribution, such as a Pareto distribution—i.e., content items accounting for approximately a majority of demand—while "Long Tail" content may refer to the lower 80% of content items in a rank-ordered distribution, such as a Pareto distribution. In other illustrative implementations, "popular" content may be determined based on threshold values, such as the n most demanded items, or the n-th percentile of most demanded items, while "less popular" or "Long Tail" content refers to the remaining available content items. In further implementations, popularity may be determined based on actual demand, anticipated demand, or both.

Finally, the instantaneous load balancing process 222 among IP Video and high-speed data (HSD) channels allows the system to scale with large numbers of customer locations 240 and extensive amount of video programs and reach 100% average utilization. All of this is done, in an embodiment of the present invention, without using additional statistical multiplexing rate shaping to fit video streams into QAM channels which can degrade video quality or without causing the dropped packet issues prevalent in other approaches, which may force the use of packet recovery algorithms with their associated drawbacks.

Rather than treat the 4 channels as a single bonding group, an embodiment of flexible channel bonding of the present invention allows overlapping bonding groups. Consider that a single unbonded channel can be considered a bonding group of size one. As one example, we create five total bonding groups: four single channel groups (one per channel) and then a four-channel bonding group that spans all four channels. As video streams are added, they are put into available space on one of the single channel bonding groups. This continues until the groups fill up. At this point, there is not sufficient room on any one channel to add another stream. However, by putting additional streams in the 4-channel bonding group, the instantaneous load balancing process 222 spreads these video streams in available space across all 4 channels.

It is interesting to note that variations of the single-channel packing and bonding group overlay packing are possible. For example, it may be desirable to support a class of 2-channel bonding group services. In this case, those services may be allocated across a pair of channels (a 2-channel bonding group) together with single-channel services and 4-channel bonding group services. Alternately, if a set of modems are deployed that support only 4-channel bonding and newer modems support, say, 8-channel bonding groups, this overlapping of bonding groups (logically by service class) can be extended, with some single-channel services, some 2- or 3-channel services, and some 4-channel-group services able to be received by both older and newer modems. Thus, the flexibility of flexible bonding is over a wide range of bonding group combinations, not just a 1:N packing combination.

Figure 1B:
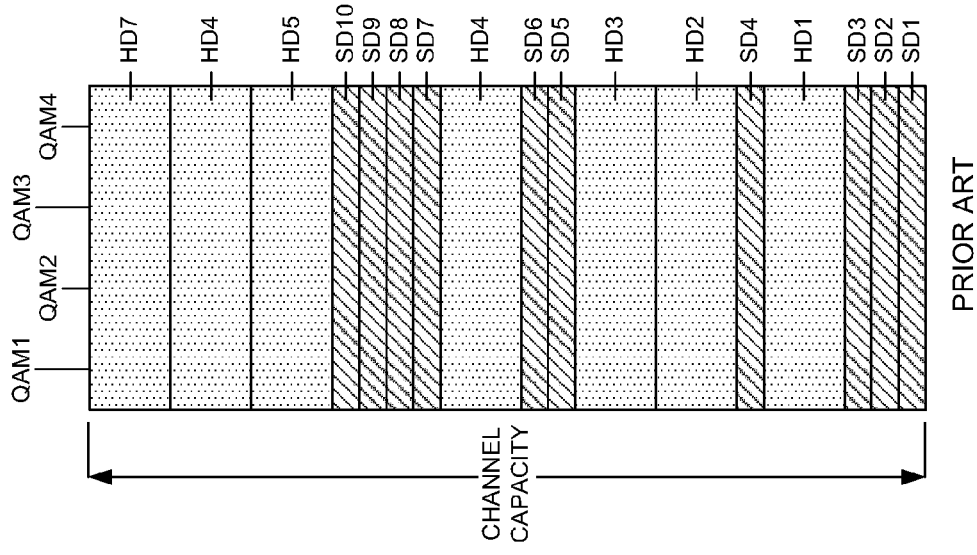
FIG. 1A and FIG. 1B depict an illustrative comparison of 4 separate quadrature amplitude modulation (QAM) channels to a 4-channel bonding group, in accordance with the prior art.
Figure 1A:
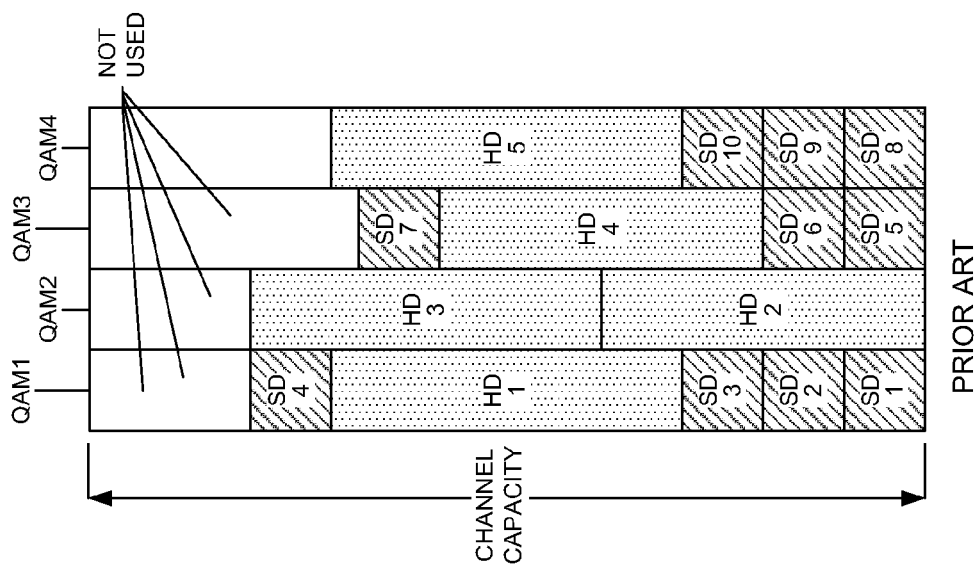

Referring to FIG. 1A, this means that the 10 SD and 5 HD streams are supported in separate unbonded channels, but aspects of the present invention provide for 2 additional HD streams to be placed in the 4-channel bonded group and fill the space that was previously "NOT USED". These aspects of the present invention result in a new configuration shown in FIG. 3.

Figure 3:
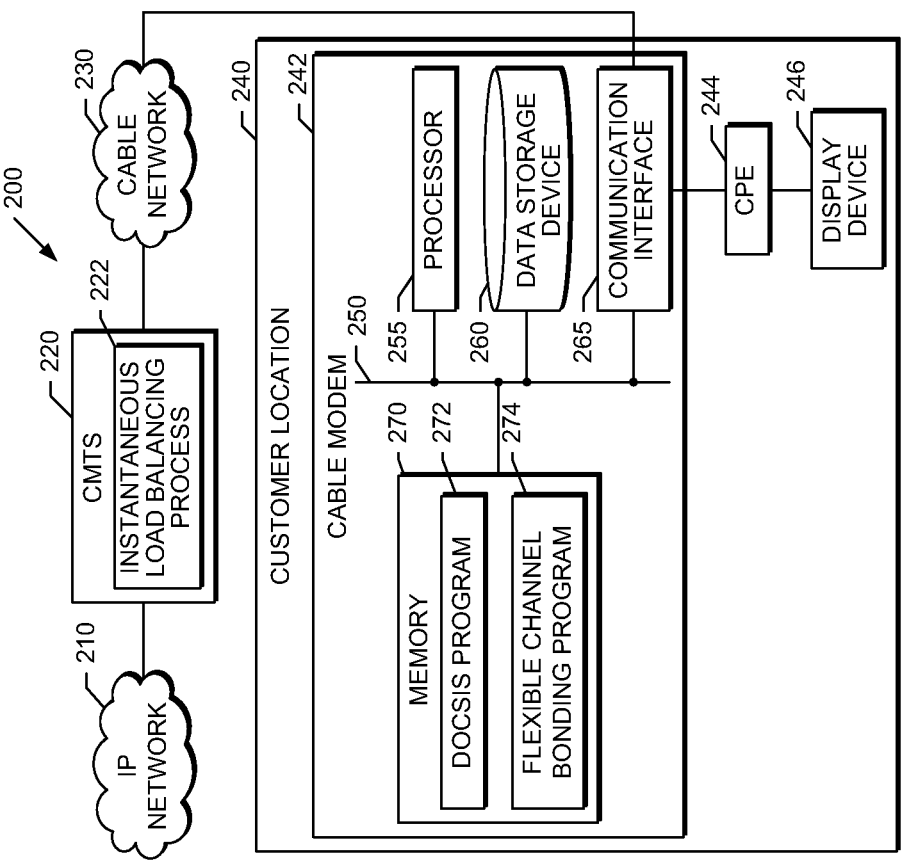
FIG. 3 depicts a bonding group overlapping unbonded channels, in accordance with an embodiment of the present invention.

FIG. 3 depicts a bonding group overlapping unbonded channels, in accordance with an embodiment of the present invention. As shown in FIG. 3, in an illustrative embodiment, the net effect is that the 10 SD and 5 HD streams shown in the example of FIG. 1A can be accessed as unbonded channels by any capable modem, regardless of their resources available (i.e., they do not have to support 4-channel bonding). Also, the overall capacity of the network remains the same: in this example, 10 SD and 7 HD streams.

In the example in the Bernstein prior art, a single channel can support 14 SD streams so a total of 56 SD streams can be placed in the four single-channel bonding groups. In the illustrative embodiment depicted in FIG. 3, the total bandwidth available for use is the same as in the Bernstein example with 4-channel bonding group; therefore, the approach of this embodiment can support a total of 63 SD streams as well, with the 7 additional streams spread across the 4 channels in the 4-channel bonding group.

In practice, in the illustrative example of FIG. 3, the 56 more popular streams end up in single channel groups and can be used by any DOCSIS device independent of their available bonding resources. The 7 streams spread across the 4-channel bonding group will tend to be Long Tail or Video-On-Demand (VOD)/unicast content watched by a single user with no need to be shared. Thus, we achieve the best of both worlds—maximum VBR capacity with the ability to share video streams with any DOCSIS device regardless of the number of channels it has available.

The example in Bernstein assumed video encoded in MPEG-2. However, if we instead use MPEG-4/AVC encoded video, we will be able to get more video streams per QAM channel. With conventional technology, that would be approximately 5 HD CBR streams per QAM, or 20 SD CBR streams per QAM, or some combination thereof.

The cable network 230 shown in FIG. 2 is a broadband network that combines optical fiber and coaxial cable, technology that has been commonly employed globally by cable television operators since the early 1990s. The fiber optic network extends from the cable operators master head end, sometimes to regional head ends, and out to a neighborhood hubsite, and finally to a fiber optic node that serves anywhere from 25 to 2000 homes. The master head end will usually have satellite dishes for reception of distant video signals as well as IP aggregation routers. Some master head ends also house telephony equipment for providing telecommunications services to the community. The regional head ends receive the video signal from the master head end and add to it the Public, Educational and/or Governmental (PEG) channels as required by local franchising authorities or insert targeted advertising that would appeal to the region. The various services are encoded, modulated and up-converted onto RF carriers, combined onto a single electrical signal and inserted into a broadband optical transmitter. This optical transmitter converts the electrical signal to a downstream optically modulated signal that is sent to the nodes. Fiber optic cables connect the head end to optical nodes in a point-to-point or star topology, or in some cases, in a protected ring topology.

The customer location 240 shown in FIG. 2, in one embodiment, is the premises, such as a home, of a customer such as a cable subscriber. The customer location 240 includes a cable modem 242, customer premises equipment (CPE) 244, and a display device 246. In various embodiments, the CPE 244 is a set-top box or Digital Television (DTV) Converter (DTC), and the display device 246 is an Internet Protocol Television (IPTV) or analog television.

The cable modem 242 shown in FIG. 2, in one embodiment, is a general-purpose computing device that performs the present invention. A bus 250 is a communication medium that connects a processor 255, data storage device 260 (such as a Serial ATA (SATA) hard disk drive, optical drive, Small Computer System Interface (SCSI) disk, flash memory, or the like), communication interface 265, and memory 270 (such as Random Access Memory (RAM), Dynamic RAM (DRAM), non-volatile computer memory, flash memory, or the like). The communication interface 265 connects the cable modem 242 to the cable network 230 and allows for communication of data and content. In one embodiment, the cable modem 242 is implemented as an application-specific integrated circuit (ASIC).

The processor 255 performs the disclosed methods by executing the sequences of operational instructions that comprise each computer program resident in, or operative on, the memory 270. The reader should understand that the memory 270 may include operating system, administrative, and database programs that support the programs disclosed in this application. In one embodiment, the configuration of the memory 270 of the cable modem 242 includes a DOCSIS program 272, and a flexible channel bonding program 274. The DOCSIS program 272 is a program that implements the DOCSIS 3.0 specification. The DOCSIS program 272 and flexible channel bonding program 274 perform the methods of the present invention disclosed in the examples depicted in FIG. 4B, FIG. 4C, FIG. 5A, FIG. 5B, FIG. 5C, FIG. 6A, FIG. 6B, FIG. 7A, FIG. 7B, FIG. 8A, FIG. 8B, FIG. 9, and FIG. 10. When the processor 255 performs the disclosed methods, it stores intermediate results in the memory 270 or data storage device 260. In another embodiment, the memory 270 may swap these programs, or portions thereof, in and out of the memory 270 as needed, and thus may include fewer than all of these programs at any one time.

Figures 4A, 4B, 4C:
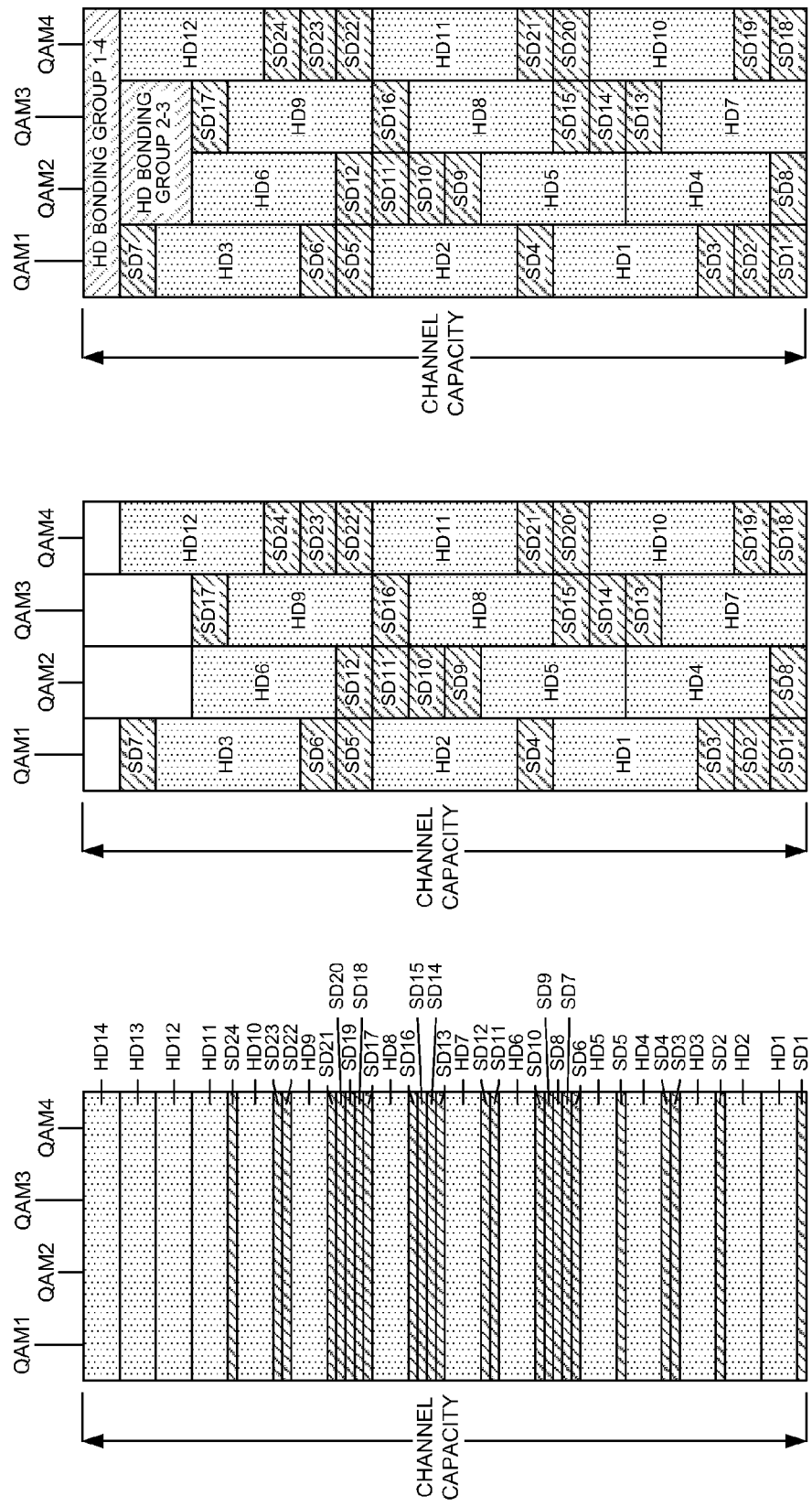
FIG. 4A, FIG. 4B, and FIG. 4C depict packing inefficiencies for SD and HD CBR streams, and show the impact of bonding and unbonded channels, in accordance with an embodiment.

FIG. 4A, FIG. 4B, and FIG. 4C depict packing inefficiencies for SD and HD CBR streams, and show the impact of bonding and unbonded channels, in accordance with an embodiment. As we saw previously, the unbonded QAMs may have unused capacity because any single QAM may not be able to add additional HD video. The bonded QAM channels (QAM1-QAM4) shown in FIG. 4A support 24 SD streams (SD1-SD24) and 14 HD streams (HD1-HD14), while the unbonded QAM channels (QAM1-QAM4) shown in FIG. 4B only support 24 SD streams (SD1-SD24) and 12 HD streams (HD1-HD12). FIG. 4C depicts the addition of an overlapping bonding group to the unbonded QAM channels (QAM1-QAM4) that allows two additional HD streams (HD Bonding Group 1-4 and HD Bonding Group 2-3) to be supported, thus matching the number of bonded QAM channels shown in FIG. 4A with 24 SD streams (SD1-SD24) and 14 HD streams (HD1-HD14).

FIG. 4A, FIG. 4B, and FIG. 4C depict how the overlapping bonding group on unbonded channels can overcome inefficiencies when packing SD and HD CBR video streams together and there is not sufficient room for additional HD streams. Another inefficiency problem arises, however, when using VBR video streams. An example using MPEG-4/AVC HD VBR streams is shown in FIG. 5A, FIG. 5B, and FIG. 5C.

Figure 5C:
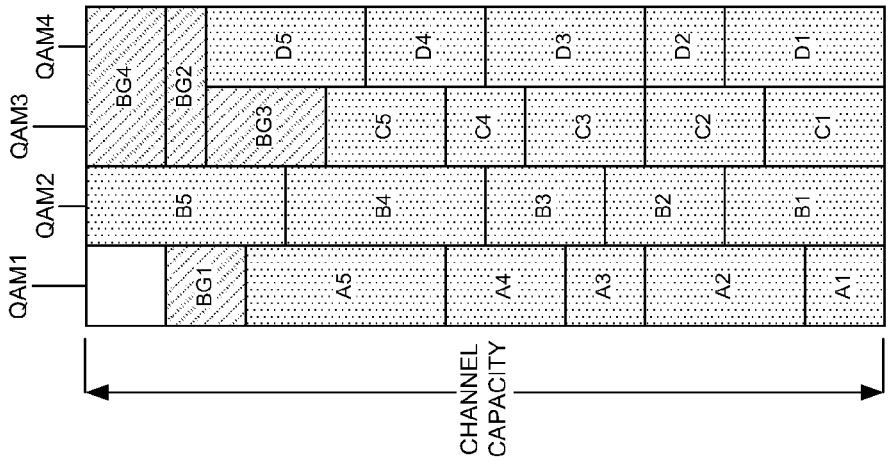
FIG. 5A, FIG. 5B, and FIG. 5C depict multiplexing (muxing) inefficiencies for HD VBR, in accordance with an embodiment.
Figure 5B:
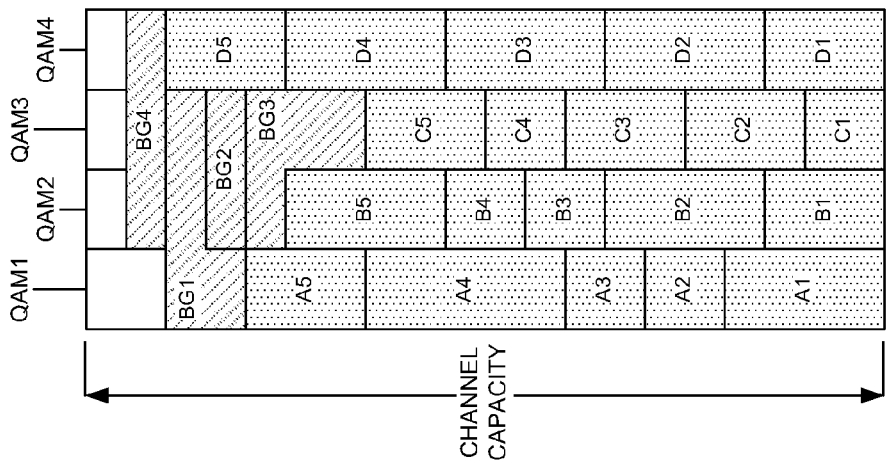
Figure 5A:
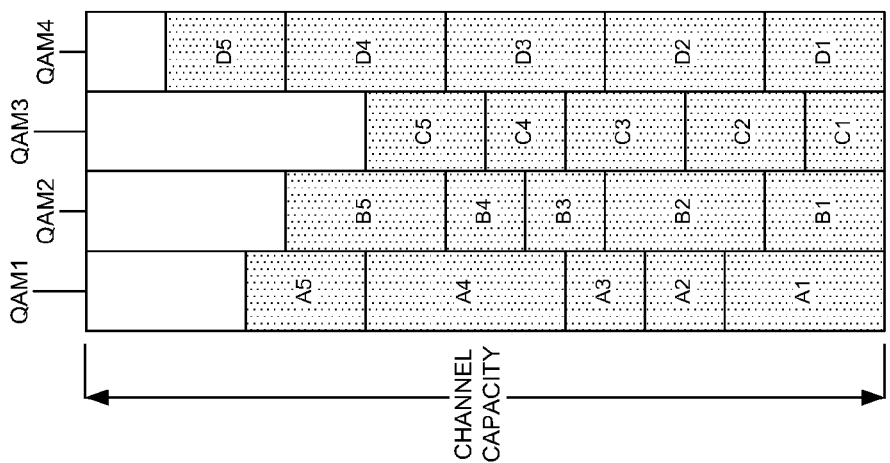

FIG. 5A, FIG. 5B, and FIG. 5C depict multiplexing (muxing) inefficiencies for HD VBR, in accordance with an embodiment. FIG. 5A depicts the baseline scenario. Based on today's technology, one might be able to reasonably fit 5 HD VBR streams in a single QAM (A1-A5 in QAM1, B1-B5 in QAM2, C1-C5 in QAM3, D1-D5 in QAM4, and E1-E5 in QAM5) without a significant probability of channel overflow and dropped packets. Using the methodology in Bernstein, one might expect 4-bonded channels to support 24 HD VBR streams.

Advantageously, using embodiments of the innovation described herein, a 4-channel bonding group can be overlaid on top of the four unbonded QAM channels. This would allow another 4 HD VBR streams (BG1-BG4) to be supported as shown in FIG. 5B and FIG. 5C. It should be noted that FIG. 5B and FIG. 5C depict the same set of video streams at different points of time. The 20 unbonded HD streams (A1-A5, B1-B5, C1-C5, and D1-D5) remain on their respective QAM channel, but the four bonded HD streams (BG1-BG4) are flexibly sized (i.e., the size of each bonding group may vary) and dynamically moved to the QAM with excess bandwidth (i.e., bandwidth that is available because it was not used when allocating the video streams to individual unbonded channels). This action is called dynamic load balancing. By overlaying a bonding group over unbonded channels, the present invention also achieves 24 HD VBR streams over 4 QAMs, but with the benefit that 20 HD VBR streams remain unbonded.

It should be noted that while the illustration of FIG. 5A, FIG. 5B, and FIG. 5C show all streams as contiguous (i.e., occupying adjacent QAMs), in another embodiment, the streams may be non-contiguous (i.e., allocated across non-adjacent QAMs).

A further benefit of an embodiment of the present innovation is increased video utilization compared to traditional approaches as shown in Bernstein. Bernstein describes an experiment that shows a 4-channel bonding group achieving an efficiency of 91.3% (i.e. full utilization would be 69 video streams). (See FIG. 3 of Bernstein.) Bernstein experimentally used SD encoded video and a HITS video source that is highly multiplexed and rate shaped, and found that using higher rate HD traffic and true unmodified VBR video sources, the efficiency will be lower and starts to approach 80%.

With the flexible channel bonding approach of an embodiment of the present invention, the 4-channel bonding group shown in FIG. 5A, FIG. 5B, and FIG. 5C can be expanded to also include the High Speed Data (HSD) channels. The HSD channels may support many different types of services. In general, these have the characteristic of being less time/delay sensitive then a live video service. Some example of services on the HSD channels might include best effort data traffic, web surfing, internet-based video viewing (e.g., adaptive streaming) or even pre-stored video such as video-on-demand HSD service rates are often calculated over many seconds, as compared to VBR video bursts and peaks which are sub-second. Let's assume 8-channels for this example. By sharing across a larger pipe, the four IP Video channels can now be run at 100% utilization (e.g., 69 streams in Bernstein). Using the example from Bernstein, the 56 most popular video streams will be placed in the four single-bonded groups. This time, an additional 13 streams are placed in the 8-channel bonding group. Conceptually, the instantaneous load balancing of a bonding group can try to keep these streams in the 4 IP Video channels. On average, these keep 100% full and the HSD service has four channels of total bandwidth. When the aggregate VBR traffic bursts exceed the capacity of the 4 IP Video channels, the excess video traffic automatically overflows onto the HSD channels. Conversely, when the aggregate VBR traffic is less than the capacity of the four IP Video channels, the instantaneous load balancer can move excess HSD traffic to the IP Video channels. Hence, over time, both HSD and IP Video can average 100% utilization of each of their four channels.

Figure 6A:
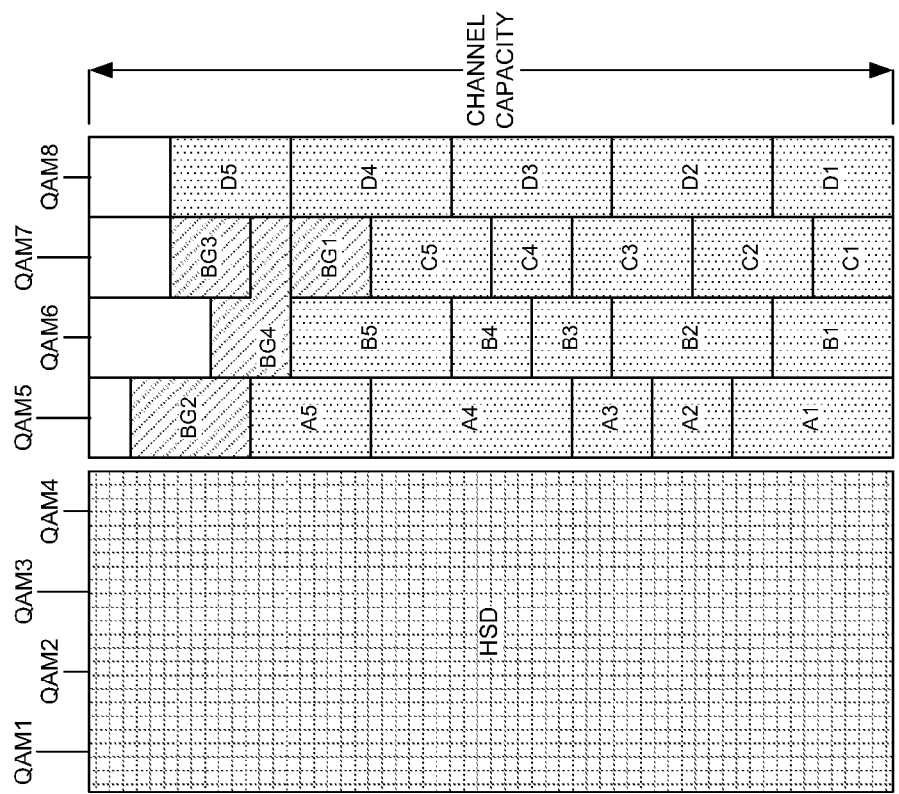
FIG. 6A and FIG. 6B depict leveraging bonding groups across HSD and IP Video, in accordance with an embodiment, and shows this scenario using MPEG-4/AVC HD VBR video streams.
Figure 6B:
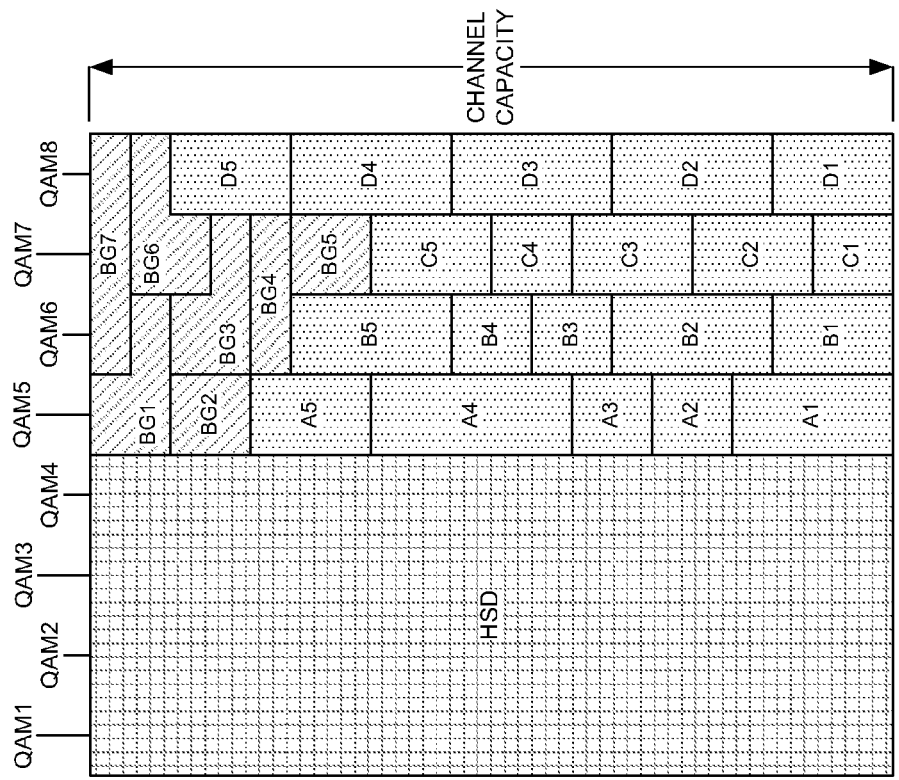

FIG. 6A and FIG. 6B depict leveraging bonding groups across HSD and IP Video, in accordance with an embodiment, and shows this scenario using MPEG-4/AVC HD VBR video streams. FIG. 6A depicts the previous example where the HSD and the IP Video are isolated 4-channel bonding groups (QAM1-QAM4 and QAM5-QAM8, respectively). FIG. 6B depicts the HSD and IP Video bonding groups merged into a single 8-channel bonding group (QAM1-QAM8). The unbonded HD VBR streams (A1-A5, B1-B5, C1-C5, and D1-D5) always remains on the IP Video QAMs (QAM5-QAM8). In this example, the bonded HD VBR streams (BG1-BG4) are nominally put in the IP Video QAMs (QAM5-QAM8) as well. On average, the bonded HD VBR streams (BG1-BG4) will fill up the rest of the IP Video QAMs (QAM5-QAM8) while data fills the HSD QAMs (QAM1-QAM4). Note that 3 additional bonded HD streams (BG5-BG7) have been in FIG. 6B due to the excess bandwidth that was reserved to allow the VBR streams to peak.

Figure 7B:
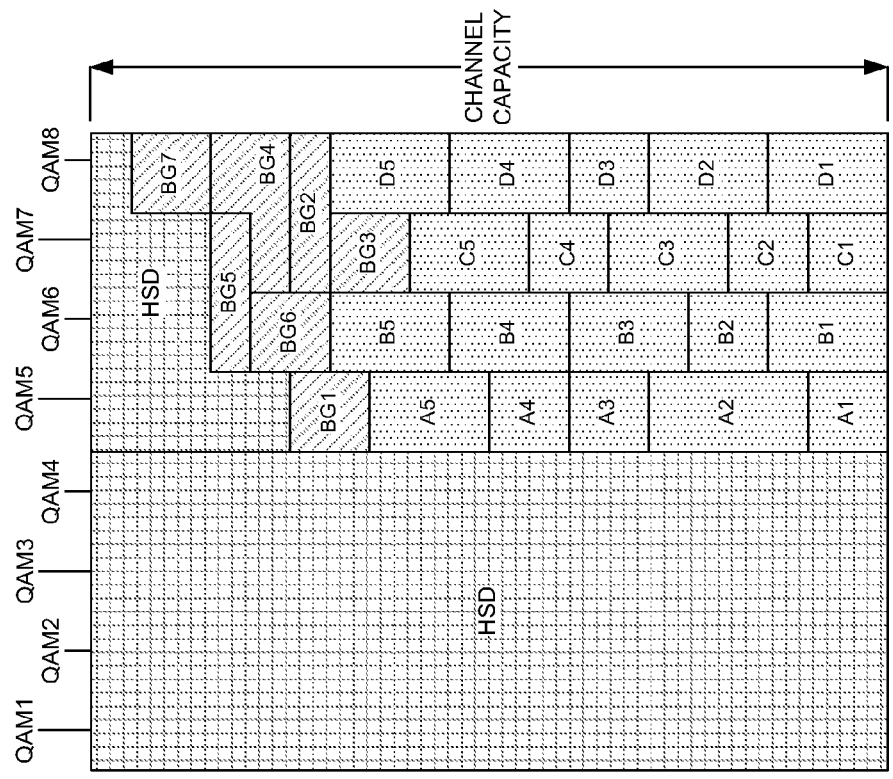
FIG. 7A and FIG. 7B depicts leveraging bonding groups across HSD and IP Video, Overflow & Underflow, in accordance with an embodiment.
Figure 7A:
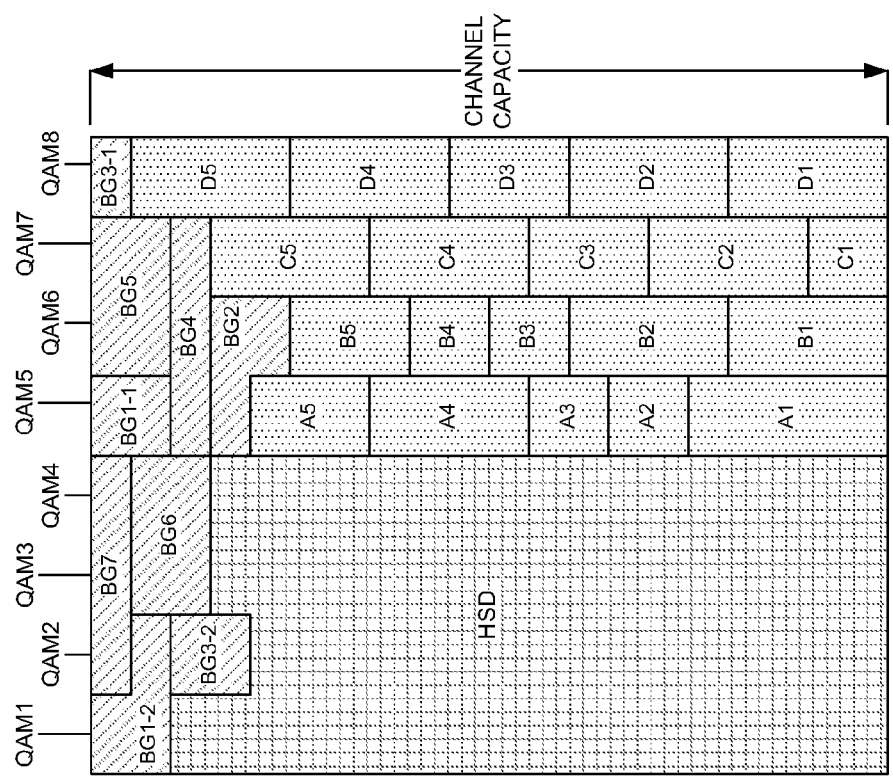

FIG. 7A and FIG. 7B depicts leveraging bonding groups across HSD and IP Video, Overflow & Underflow, in accordance with an embodiment. FIG. 7A and FIG. 7B demonstrate what happens as the VBR traffic grows and shrinks. In FIG. 7A, the VBR streams have collectively peaked and overflowed the IP Video QAMs (QAM5-QAM8). While the 20 unbonded HD streams (A1-A5, B1-B5, C1-C5, and D1-D5) remain on their respective IP Video QAM (QAM5-QAM8), several of the bonded HD streams (BG1-2, BG3-2, BG6, and BG7) are scheduled on the HSD QAMs (QAM1-QAM4) to alleviate the bandwidth pressure. In FIG. 7B, the VBR traffic has collectively shrunk and the IP Video QAMs (QAM5-QAM8) are no longer fully utilized. With the extended 8-channel bonding group, the CMTS 220 can now schedule HSD traffic on the IP Video QAMs (QAM5-QAM8). FIG. 7A and FIG. 7B are two different snapshots in time showing that the average HSD traffic should approach its original bandwidth from the four HSD QAMs (QAM1-QAM4).

A further benefit of the approach of this embodiment is that it also eliminates the possibility of dropped video packets due to congestion. This is because IP video is prioritized over High Speed Data. When VBR capacity temporarily exceeds the 4 channels allocated for IPTV, the excess "crowds out" the HSD traffic, potentially causing an HSD packet delays and possible drops. HSD protocols are almost exclusively with TCP, which automatically retransmits dropped packets. In Bernstein, they recognize that with their fixed bonding group approach that there is still some probability of a dropped packet and that a packet recovery algorithm is needed. A packet FEC approach would consume an additional 5-20% of the bandwidth capacity; while a re-transmission approach adds a Repair Server and introduces additional delay into the path to compensate for detection, requesting and re-transmitting dropped packets. With an embodiment of the presently disclosed invention, there is zero IP video packet loss, zero increased overhead for IP video FEC, and zero increased cost of recovery servers. These advantages can be achieved by combining lossless VBR IP video with loss-tolerant HSD data on the same DOCSIS 3.0 bonding group.

The next major advantage of an embodiment of the present invention is its ability to scale for large numbers of subscribers. As IP Video scales to hundreds of subscribers and hundreds of offered video programs, the total need for video streams, especially with lots of HD content, exceeds the capacity for a single 4-channel grouping. For example, a 4-channel bonding group may only be able to support two dozen HD streams, much less than the 100's of programs that are being planned to be offered. A system may need something on the order of 16 to 24 channels to deliver hundreds of HD and SD programs to hundreds of subscribers. This would require four or more separate 4-channel bonding groups from our previous example.

If one were to keep the fixed non-overlapping groups of conventional systems, problems would be introduced. Since consumer devices can only be in one bonding group at a time, devices may need to switch bonding groups to access different content. Many devices will be capable of receiving several video streams; maybe as many as a half dozen streams (e.g., 3 or 4 TVs/PCs and a couple of recordings to a DVR). As a device requests each additional video stream, it now becomes likely that these streams are in different bonding groups. The system is now forced to add a new bonding group (i.e., 4 more channels) to enable this device to watch its unique combination of programs. Popular content will most likely need to get replicated across different bonding groups, increasing the number of channels needed. In this example, this could cause a large step increase of 25% in the number of needed channels (i.e., increase from 4 to 5 bonding groups).

However, embodiments of the Flexible Channel Bonding scheme of the present invention can be extended to easily handle this scenario. Popular content is sent in single-channel bonding groups which is accessible by any cable modem. If the device needs multiple video streams, it is only limited by the range of its wideband tuner; it is not limited by a fixed 4-channel bonding group. The Long Tail and VOD/unicast content sent to individual subscribers is assigned to larger bonding groups (e.g., 4-channel) and is spread across these channels to fully utilize the channels as described above.

Figure 8A:
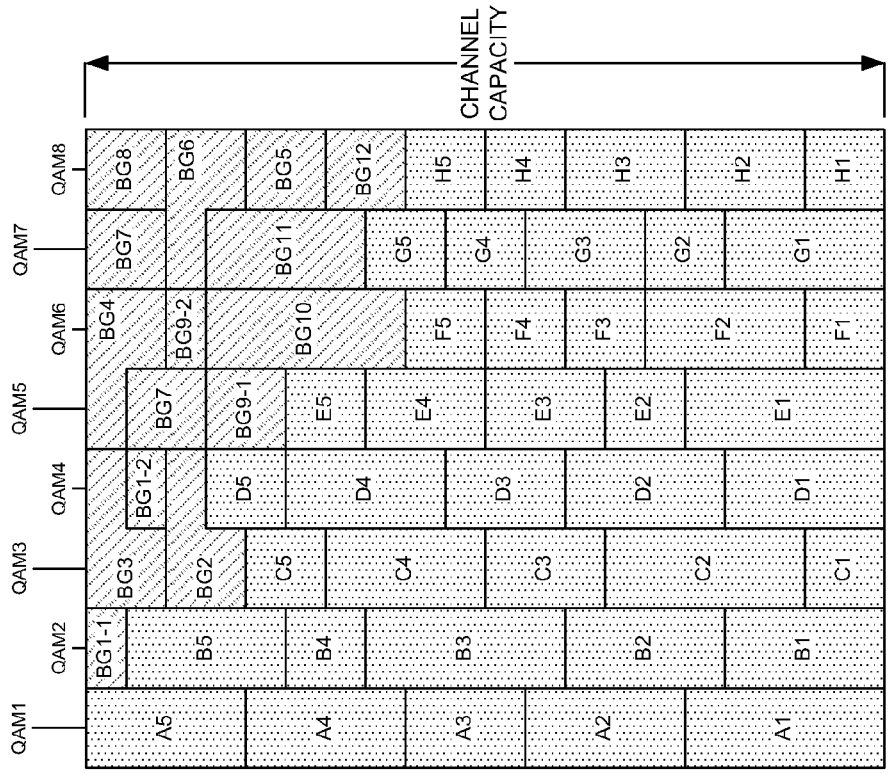
FIG. 8A and FIG. 8B depict multiple overlapping bonding groups in accordance with an embodiment.
Figure 8B:
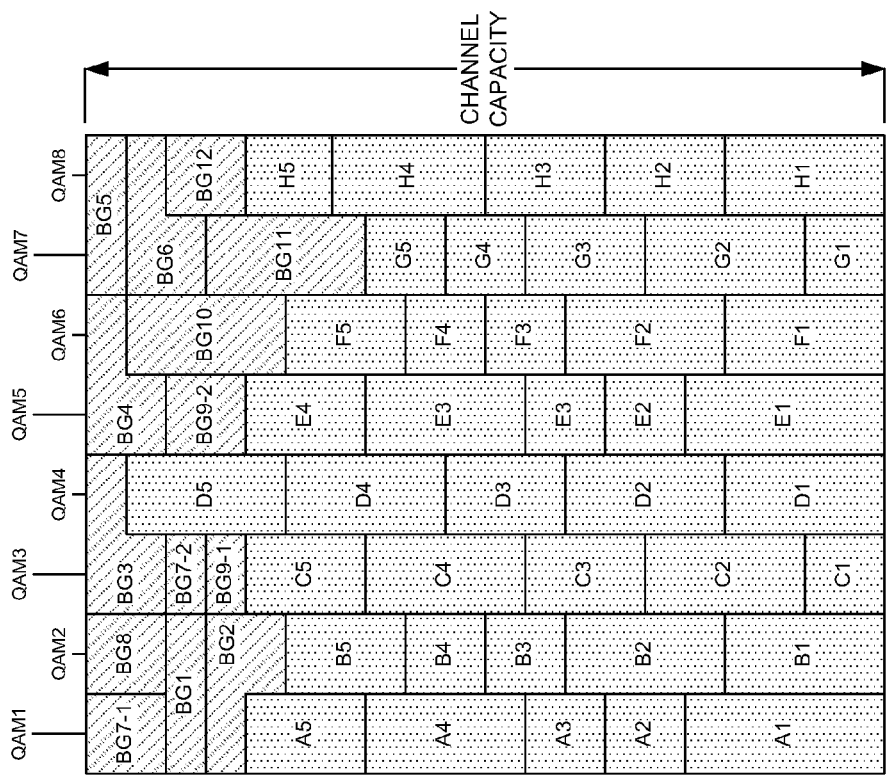

FIG. 8A and FIG. 8B depict multiple overlapping bonding groups in accordance with an embodiment. By selectively introducing overlapping bonding groups, the innovation can effectively get the statistical multiplexing advantages of the entire set of channels, not just limited to the size of the bonding group. To demonstrate, let's consider a system with 8 total IP video channels (QAM1-QAM8) but a bonding group size of 4-channels. This is shown in FIG. 8A and FIG. 8B. We can create four separate but overlapping bonding groups that cover the following bonding group channel sets: {A, B, C, D}, {E, F, G, H}, {A, C, E, G} and {B, D, F, H}, where video channel A maps to QAM1, video channel B maps to QAM2, video channel C maps to QAM3, video channel D maps to QAM4, video channel E maps to QAM5, video channel F maps to QAM6, video channel G maps to QAM7, and video channel H maps to QAM8. Next, assume that aggregate VBR peak rates have filled video channels A and B with unbonded video so there is little or no room left for any 4-channel bonded video. With instantaneous load balancing, the {A, B, C, D} group can move its HD video streams onto channels C and D. With channels A, B, C, and D now filled, the {A, C, E, G} group must utilize bandwidth on E and G; while the {B, D, F, H} group must utilize bandwidth on channels F and H. In turn, the {E, F, G, H} group must be moved to accommodate the new demands on those channels. Hence, the peaks on channel A and B cause the 4-channel bonded video to get spread across channels C thru H making this statistically an 8-channel group. It will be apparent that, without departing from the scope of the invention, overlapping bonding groups can be extended across many variations of bonding group sizes and overlapping groups to get the best utilization.

Furthermore, 100% utilization can be reached by including the HSD channels and using instantaneous load balance algorithm across multiple bonding groups as described above. As an example, let's assume the Long Tail content is spread across four groups of channels (called A, B, C, D) of 4 channels each. Four bonding groups are created that all overlap with the HSD channels. These bonding groups are: HSD+A, HSD+B, HSD+C and HSD+D. Let us assume that the aggregate VBR traffic bursts exceeds the capacity for channel groups A and C. The instantaneous load balancing algorithm can schedule the excess VBR video traffic on the HSD channels. This is identical to what was described above except now we have two overlapping bonding groups instead of one.

Now let us assume at this same time, the aggregate VBR traffic in groups B and D is below its capacity. The instantaneous load balancing algorithm can move HSD traffic to channels in groups B and D for all cable modems in those bonding groups. If this traffic amount equals the amount of A and C traffic overflow, then the system has load balanced the VBR video across all 16 channels and the HSD channels provide 4 channels of bandwidth on average.

The overlapping of bonding groups can be created in many different combinations. For instance in the example above, group A and group B may share several channels. This may become advantageous as the system expands from additional content and/or additional subscribers. Additional channels can be added to the system one at a time as needed. If you add a 17th channel to the example above, a new bonding group E can be created from this new channel plus some other channels that overlap with A, B, C and/or D. The innovation does not limit the number of combinations possible.

Figure 9:
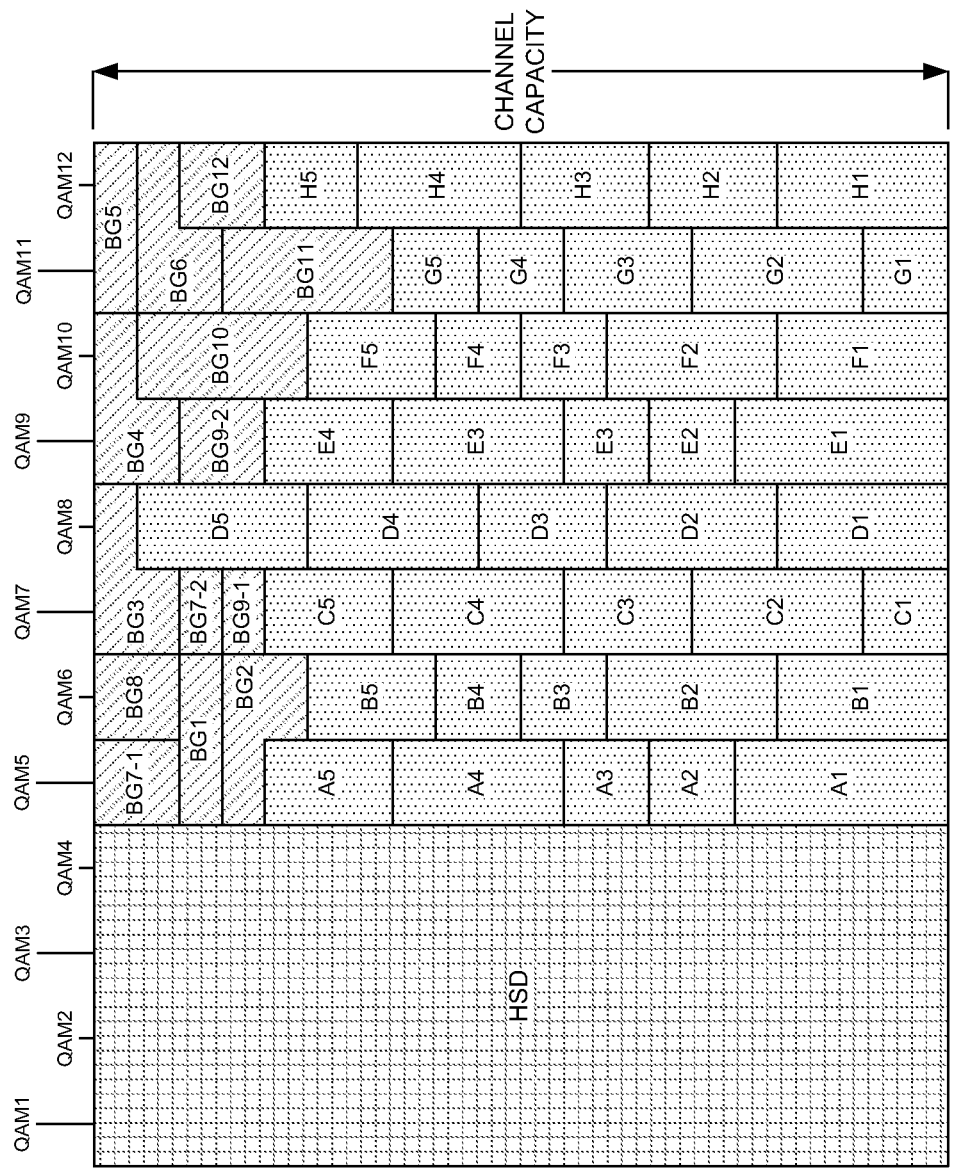
FIG. 9 and FIG. 10 depict the four overlapping bonding groups described in FIG. 8A and FIG. 8B and extend each bonding group to also include the HSD QAM channels.
Figure 10:
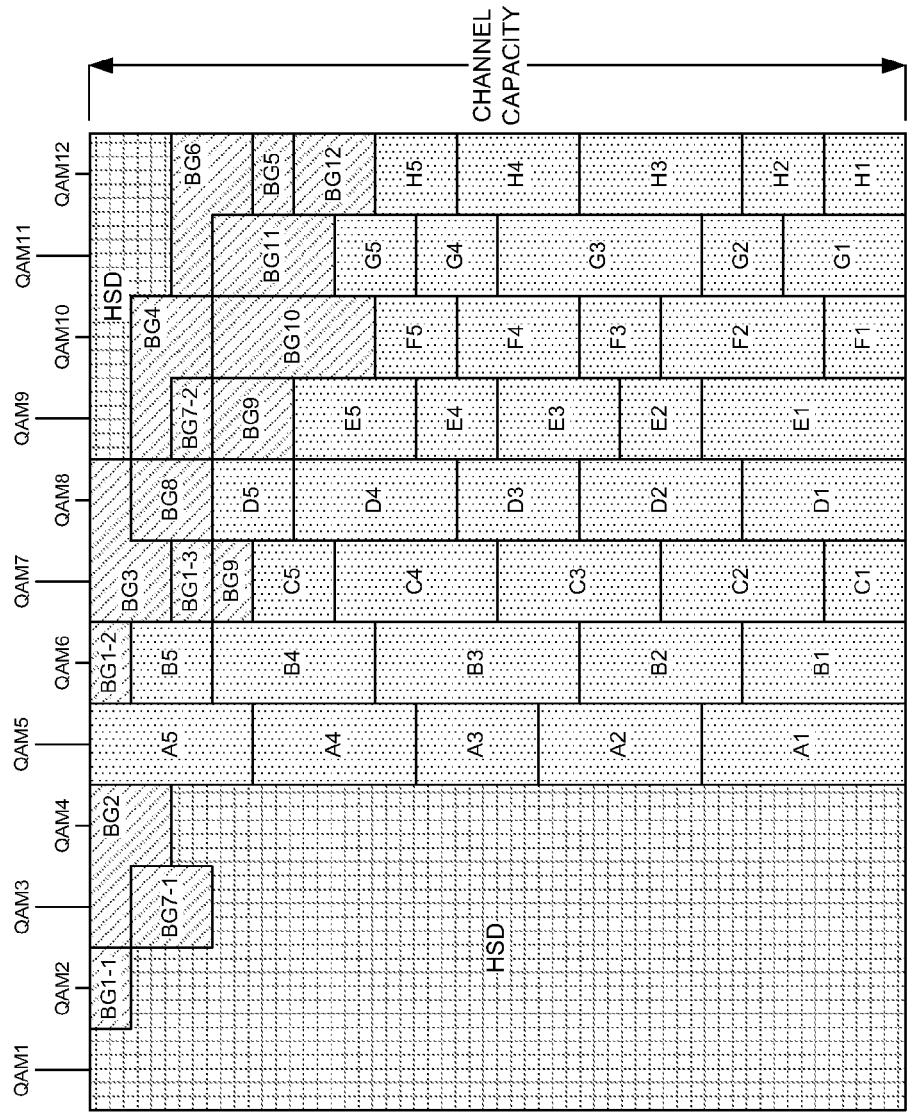

In FIG. 9 and FIG. 10, as a final example, we extend the four overlapping bonding groups described in FIG. 8A and FIG. 8B, and extend each bonding group to also include the HSD QAM channels.

The current state of art in conventional cable modem technology is limited to 8 DOCSIS QAM channels. For the total system pictured in FIG. 9 and FIG. 10, there are 4 HSD DOCSIS QAM channels (QAM1-QAM4) and 8 IP Video channels (QAM5-QAM12). Since the cable modem can only bond up to 8 channels of the 12 total, any given cable modem can channel bond a subset of the total channels. In the illustrative example depicted in FIG. 9 and FIG. 10, an embodiment defines four different bonding groups. Each bonding group (BG) consists of the four HSD QAM channels and 4 of the 8 IP Video channels.

The first BG consists of the HSD QAMs (QAM1-QAM4) plus the IP Video QAMs {QAM5-QAM8}. The second BG is the HSD QAMs (QAM1-QAM4) and IP Video QAMs {QAM9-QAM12}. The third BG is the HSD QAMs (QAM1-QAM4) and IP Video QAMs {QAM5, QAM7, QAM9, QAM11}. The fourth BG is the HSD QAMs (QAM1-QAM4) and IP Video QAMs {QAM6, QAM8, QAM10, QAM12}. Note that the third and fourth BGs overlap with the first and second BG. Hence the term "Overlapping bonding groups". It is this concept of overlapping bonding groups that is key to being able to dynamically load balance the traffic across the different DOCSIS QAMs.

FIG. 9 depicts multiple overlapping bonding groups, in accordance with an embodiment, and shows the nominal case where the data traffic remains on the HSD QAMs (QAM1-QAM4) while the four bonding groups are spread across the IP Video QAM channels (QAM5-QAM12). It is worth noting that if service demands require, it is possible to set other nominal cases, such as video service utilizing 110% "video" resources; that is, 100% of the video channels and 10% of the HSD channels. So, while our example uses a nominal or quiescent point of 100%, other values are possible. One benefit of this is that it would allow for more graceful handling of peak-busy-hour conditions by avoiding program request blocking at the expense of temporarily higher HSD overbooking.

In FIG. 10, which also depicts multiple overlapping bonding groups in accordance with an embodiment, we now consider what happens as the collective VBR streams in channels A and B (QAM5 and QAM6) expands while we see a general reduction in VBR bandwidth in the other IP Video QAMs (QAM7-QAM12). While some of the bonded traffic that used to be on A and B (QAM5 and QAM6) got moved to C and D (QAM7 and QAM8), some of it also got moved to the HSD QAMs (QAM1-QAM4). At the same time a reduction in channels E-H (QAM9-QAM12) allows some data traffic to be scheduled on those IP Video QAM channels. Thus, combining overlapping bonding groups extended to include HSD provides an optimum amount of scheduling flexibility, while allowing the majority of HD VBR streams to be delivered as unbonded traffic in a single channel that any CPE 244 device can access.

An embodiment of a Flexible Channel Bonding scheme with instantaneous load balancing can be used with CMTS 220 implementations. In further embodiments, Flexible Channel Bonding with instantaneous load balancing can also be used with CMTS 220 Bypass architectures. In further embodiments, Flexible Channel Bonding with instantaneous load balancing could be deployed in edge devices.

For example, in an illustrative embodiment applying this innovation to CMTS 220 Bypass architectures, the video content goes directly to the Edge Device (e.g., Edge QAM modulator) and bypasses the CMTS 220. The system's Session Manager that controls the Edge Device can instruct it, for each video stream, which channels are part of its bonding group. Some may have a single channel (e.g., popular content) while others may be in a larger (e.g., 4-channel) bonding group.

The additional benefits gained by multiplexing the IP Video and HSD channels are possible with CMTS 220 Bypass architectures, with the following illustrative adaptations: in such an embodiment, the HSD channels (QAM1-QAM4) will be generated from a Modular CMTS (M-CMTS) core and sent to the Edge Device. The Edge Device needs to provide flow control information back to the M-CMTS. As video traffic overflows to the HSD channels (QAM1-QAM4), the Edge Device needs to inform the M-CMTS of the reduced capacity of the HSD channels. Similarly, the Edge Device can inform the M-CMTS of excess capacity on different IP Video channels, and the M-CMTS can provide DOCSIS data to fill the IP Video channels.

The additional benefits gained by multiplexing the IP Video and HSD channels are possible with CMTS 220 Bypass architectures, with the following illustrative adaptations: in such an embodiment, the HSD channels (QAM1-QAM4) will be generated from an Integrated CMTS (I-CMTS) core and the IP Video channels (QAM5-QAM12) generated from an Edge Device. As video traffic overflows the IP Video channels (QAM5-QAM12), the Edge Device forwards the excess video to the HSD channels (QAM1-QAM4) on the I-CMTS. The I-CMTS schedules the excess video on its HSD channels (QAM1-QAM4) at an appropriate priority level to the best effort data. Similarly, the Edge Device can inform the I-CMTS of excess capacity on different IP Video channels (QAM5-QAM12), and the I-CMTS can provide best effort DOCSIS data to fill the IP Video channels (QAM5-QAM12) on the Edge device.

Although the disclosed embodiments describe a fully functioning method and system for IP video delivery, the reader should understand that other equivalent embodiments exist. Since numerous modifications and variations will occur to those reviewing this disclosure, the method and system for IP video delivery is not limited to the exact construction and operation illustrated and disclosed. Accordingly, this disclosure intends all suitable modifications and equivalents to fall within the scope of the claims.

We claim:

1. A method for IP video delivery, comprising:
   allocating a first number of video streams for delivery on a number of channels, wherein the first number of video streams include at least one popular content item;
   providing a number of bonding groups, wherein each bonding group bonds at least one of the channels; and
   allocating a second number of video streams for delivery on the number of bonding groups.

2. The method of claim 1, wherein each bonding group is flexibly sized.

3. The method of claim 1, wherein the first number of video streams are delivered as unbonded on the number of channels, and wherein each channel is a DOCSIS channel.

4. The method of claim 1, wherein the number of bonding groups utilize bandwidth unused by the first number of video streams.

5. The method of claim 4, wherein high speed data utilizes bandwidth unused by the first number of video streams or the second number of video streams.

6. The method of claim 5, wherein the high speed data includes at least one of best effort data traffic, web surfing, adaptive streaming, and video-on-demand.

7. The method of claim 1, further comprising:
providing instantaneous load balancing to spread the first number of video streams and the second number of video streams across all available bandwidth in the number of channels.

8. The method of claim 7, further comprising:
delivering the first number of video streams and the second number of video streams using a variable bit rate with no additional statistical multiplexing rate shaping to fit video streams into the number of channels.

9. The method of claim 8, wherein each bonding group is flexibly sized and bonds at least one of the number of channels or at least one of a number of high speed data channels.

10. A method for IP video delivery, comprising:
allocating a first number of video streams for delivery on a number of channels;
providing a number of bonding groups, wherein each bonding group bonds at least one of the channels; and
allocating a second number of video streams for delivery on the number of bonding groups, wherein the second number of video streams include at least one long tail content item.

11. An IP video delivery system that includes a computing device, comprising:
a memory device resident in the computing device; and
a processor disposed in communication with the memory device, the processor configured to:
allocate a first number of video streams for delivery on a number of channels, wherein the first number of video streams include at least one popular content item;
provide a number of bonding groups, wherein each bonding group bonds at least one of the channels; and
allocate a second number of video streams for delivery on the number of bonding groups.

12. The system of claim 11, wherein each bonding group is flexibly sized.

13. The system of claim 11, wherein the first number of video streams are delivered as unbonded on the number of channels, and wherein each channel is a DOCSIS channel.

14. The system of claim 11, wherein the number of bonding groups utilize bandwidth unused by the first number of video streams.

15. The system of claim 14, wherein high speed data utilizes bandwidth unused by the first number of video streams or the second number of video streams.

16. The system of claim 15, wherein the high speed data includes at least one of best effort data traffic, web surfing, adaptive streaming, and video-on-demand.

17. The system of claim 11, wherein the processor is further configured to:
provide instantaneous load balancing to spread the first number of video streams and the second number of video streams across all available bandwidth in the number of channels.

18. The system of claim 17, wherein the processor is further configured to:
deliver the first number of video streams and the second number of video streams using a variable bit rate with no additional statistical multiplexing rate shaping to fit video streams into the number of channels.

19. The system of claim 18, wherein each bonding group is flexibly sized and bonds at least one of the number of channels or at least one of a number of high speed data channels.

20. An IP video delivery system that includes a computing device, comprising:
a memory device resident in the computing device; and
a processor disposed in communication with the memory device, the processor configured to:
allocate a first number of video streams for delivery on a number of channels;
provide a number of bonding groups, wherein each bonding group bonds at least one of the channels; and
allocate a second number of video streams for delivery on the number of bonding groups, wherein the second number of video streams include at least one long tail content item.

21. A non-transitory computer-readable medium, comprising computer-executable instructions that, when executed on a computing device, perform steps of:
allocating a first number of video streams for delivery on a number of channels, wherein the first number of video streams include at least one popular content item;
providing a number of bonding groups, wherein each bonding group bonds at least one of the channels; and
allocating a second number of video streams for delivery on the number of bonding groups.

22. A non-transitory computer-readable medium, comprising computer-executable instructions that, when executed on a computing device, perform steps of:
allocating a first number of video streams for delivery on a number of channels;
providing a number of bonding groups, wherein each bonding group bonds at least one of the channels; and
allocating a second number of video streams for delivery on the number of bonding groups, wherein the second number of video streams include at least one long tail content item.

\* \* \* \* \*